(12) United States Patent
Nisikawa

(10) Patent No.: US 7,735,873 B2
(45) Date of Patent: Jun. 15, 2010

(54) SHIPPING METHOD AND SHIPPING SLIP

(75) Inventor: Masaaki Nisikawa, Osaka (JP)

(73) Assignee: Sunny Co., Ltd., Osaka (JP)

( * ) Notice: Subject to any disclaimer, the term of this patent is extended or adjusted under 35 U.S.C. 154(b) by 328 days.

(21) Appl. No.: 10/572,533

(22) PCT Filed: Apr. 12, 2005

(86) PCT No.: PCT/JP2005/007104

§ 371 (c)(1),
(2), (4) Date: Apr. 27, 2006

(87) PCT Pub. No.: WO2006/112004

PCT Pub. Date: Oct. 26, 2006

(65) Prior Publication Data

US 2007/0187948 A1      Aug. 16, 2007

(51) Int. Cl.
*B42D 15/10*      (2006.01)
*B41L 1/00*      (2006.01)
(52) U.S. Cl. .............................. 283/70; 283/67; 283/75; 283/81; 283/94; 283/98; 462/69
(58) Field of Classification Search .................. 283/67, 283/70, 72, 74, 75, 81, 94, 98, 100, 101, 283/106, 107, 109, 110; 428/203; 462/55, 462/66, 69, 903
See application file for complete search history.

(56) References Cited

U.S. PATENT DOCUMENTS 1,833,869 A  *  11/1931  Cotton et al. .................. 283/74
3,987,960 A  *  10/1976  Gardiner ....................... 229/74
4,512,595 A  *   4/1985  Breen ........................... 283/70
4,614,363 A  *   9/1986  Breen ........................... 462/55

FOREIGN PATENT DOCUMENTS

| JP | 2001-270544 | 10/2001 |
| JP |     3107438 | 12/2004 |
| JP | 2005-067814 |  3/2005 |
| JP | 2005-104558 |  4/2005 |

* cited by examiner

*Primary Examiner*—Dana Ross
*Assistant Examiner*—Pradeep C Battula
(74) *Attorney, Agent, or Firm*—Jordan and Hamburg LLP

(57) ABSTRACT

The present invention provides a shipping method for guaranteeing that an article for shipping has remained sealed with a seal and has remained unopened. Specifically, first, the sender is asked to enter a signature on a seal. Because of the pressure from a writing implement at time of entering, the signature is copied to a sheet for verification. An article for shipping is sealed with a seal and transported to a recipient. The signature on the seal is verified against the signature on the sheet for verification. By confirming that the two match, it is confirmed that the seal has not been replaced. Thus it is guaranteed that the article for shipping has remained sealed with the seal and has remained unopened.

3 Claims, 3 Drawing Sheets

SHIPPING METHOD AND SHIPPING SLIP

BACKGROUND OF THE INVENTION

The present invention relates to a shipping method and shipping slip for delivering to a recipient an article for shipping accepted from a sender and guaranteeing that the article for shipping has remained unopened from time of acceptance from sender until delivery to recipient.

Generally, when a package is to be sent to another party, a shipping service such as parcel post or parcel delivery is most often used. However, with the use of a shipping service to send confidential documents and valuable goods in particular there is a demand for a guarantee that an article for shipping has remained unopened during delivery from sender to recipient. In this regard, sealing an article for shipping with a seal enables confirmation that the article for shipping has remained unopened (for example, patent document 1).
Patent document 1: Laid-open Japanese Utility Model Registration No. 3107438.

BRIEF SUMMARY OF THE INVENTION

However, even when an article for shipping is sealed with a seal, if a third party opens and reseals it before it reaches the recipient, the recipient will not be aware that this article for shipping has been opened.

It is an object of the present invention to provide a shipping method and shipping slip for guaranteeing that an article for shipping has remained sealed with a seal and unopened.

To achieve the above object, the shipping method relating to the present invention comprises the delivery of an article for shipping from a sender to a recipient and the guarantee that the article for shipping has remained unopened since acceptance from sender until delivery to recipient. Specifically, first, when an article for shipping is accepted from a sender, the sender enters sender-provided information on a seal. Sender-provided information may include, for example, a signature entered by a sender. This signature is copied onto, for example, a sheet for verification on which the seal is superimposed. Next, the article for shipping is sealed with a seal and transported to the recipient. When the article for shipping is delivered to the recipient, the sender-provided information entered on the seal is checked against the sender-provided information copied to the sheet for verification, thereby guaranteeing that the article for shipping has remained sealed with the seal having the sender-provided information entered by the sender.

With this configuration, the sender-provided information entered on the seal is checked against the sender-provided information copied on the sheet for verification, thereby enabling confirmation that the seal has not been replaced with another seal.

Here, the article for shipping may be an envelope with documents or a package or other article to be opened for removal of contents, a device for which it is required that the contents remain confidential, or any other article to be sealed. The sender-provided information may be a signature, letters, codes, diagrams, illustrations, or the like entered by a sender. While the concept of entry here includes provision of individual information using a stamp, seal, typewriter or the like, it is preferable to use handwriting, which cannot be automatically reproduced. While a copier may be used for copying the sender-provided information, using carbon paper or the like to copy using pressure from a writing implement facilitates copying.

The sender-provided information may be verified by simply comparing the sender-provided information on the seal and the sender-provided information on the sheet for verification. But by constituting the sheet for verification with a translucent material that permits viewing therethrough and superimposing the sheet for verification on the seal to verify the sender-provided information, the sender-provided information can be simply and accurately verified.

Generally, in shipping, a slip comprising a sender's copy, recipient's copy and shipping control sheet in a superimposed fashion enabling copying is used for shipping confirmation and control and is shipped together with an article for shipping. The seal and sheet for verification may be superimposed upon the slip so that the sender-provided information entered on the seal is copied onto the sheet for verification and onto the slip. The seal and sheet for verification may be formed integrally with the slip.

If sender-provided information copied to the sheet for verification is to be checked against the sender-provided information copied to the slip to confirm that the sheet for verification has not been replaced with a different sheet, the sheet for verification and the article for shipping can be sent together. In other words, because the sender-provided information on the sheet for verification is checked against the sender-provided information on the slip, even if the seal and sheet for verification have been replaced, this can be detected.

Further, because the sender's copy is not sent with the article for shipping but kept by the sender, the sender-provided information copied to this sender's copy can be checked against the sender-provided information copied to the sheet for verification, thereby further guaranteeing that the sheet for verification has not been replaced. Examples of means for verifying the sender-provided information copied to the sender's copy against the sheet for verification may include sending the sender's copy or a copy thereof separately from the article for shipping, and sending an electronic image of the sender's copy.

Further, because a slip often has slip-specific information affixed thereto, such slip-specific information can be used to identify a slip. In such a case, by simply checking the slip-specific information of the sender's copy as relayed by the sender against the slip-specific information on the recipient's copy or shipping control slip, it can be confirmed that the slip has not been replaced. As a result, without directly checking the sender's copy against the sheet for verification, simply by checking the sender-provided information copied to the recipient's copy or shipping control slip against the sender-provided information copied to the sheet for verification, it can be made even more certain that the sheet for verification has not been replaced.

Here, the concept of slip-specific information includes a code number printed so as to be visible, specific information written with fluorescent paint that can be viewed only irradiated with light, and specific information recorded on an IC chip, barcode or the like. Examples of means for transmitting this slip-specific information from the sender include telephone, fax, e-mail, and letter. Sender-provided information may be sent together with the slip-specific information.

To prevent the seal and sheet for verification from both being replaced at the same time, an article for shipping sealed with a seal may be delivered to a recipient separately from the sheet for verification. Examples of means for delivering the sheet for verification to a recipient include sending the sheet for verification enclosed in an envelope via separate route.

The present invention also provides a shipping slip for guaranteeing that the article for shipping has remained unopened. Specifically, the present invention provides a shipping slip comprising 1) a slip comprising a sender's copy, recipient's copy and shipping control slip in superimposed fashion, 2) a seal on which sender-provided information can be entered, and a sheet for verification entered on is sender-provided information identical to that entered on the seal.

The slip, seal and sheet for verification may be superimposed in order of the seal on top; the sender-provided information is entered on the seal, enabling copying to the sheet for verification. Alternatively, the sender-provided information entered on the seal may be copied to both the sheet for verification and the slip. Further, the sheet for verification may be formed of a translucent material permitting viewing therethrough and superimposed on the seal sealing the article for shipping, thereby enabling verification of the sender-provided information.

The seal may be configured so as to break when peeled off the article for shipping. Alternatively, a translucent cover seal may be affixed so as to cover the seal and this cover seal is broken when peeled off the article for shipping. Examples of a translucent cover seal include a sheet formed of a translucent material and a sheet formed as a mesh, enabling the sender-provided information on the seal to be viewed therethrough.

Further, the seal and sheet for verification are not limited to ones to be superimposed on a slip. In an alternative configuration, a seal and sheet for verification may be stacked to constitute a seal set for guaranteeing that the article for shipping has remained unopened.

Specifically, the present invention provides a seal set comprising a seal on which sender-provided information can be entered superimposed on a sheet for verification to which the sender-provided information entered on the seal is to be copied, the sheet for verification being formed of a translucent material enabling viewing therethrough. Superimposition of the sheet for verification on the seal sealing the article for shipping enables verification of the sender-provided information.

As is clear from the above explanation, with the present invention, the sender-provided information entered on the seal is checked against the sender-provided information copied to the sheet for verification, thereby guaranteeing that the seal has not been replaced and the article for shipping has remained sealed. As a result, it can be guaranteed that the article for shipping has remained unopened during delivery from sender to recipient, so that sending confidential documents and valuable goods can be done with peace of mind.

BRIEF DESCRIPTION OF THE DRAWINGS

Accompanying the specification are figures which assist in illustrating the embodiments of the invention, in which.

DETAILED DESCRIPTION OF THE INVENTION

An embodiment of a shipping method and shipping slip relating to the present invention will be explained below with reference to the drawings.

Figure 1:
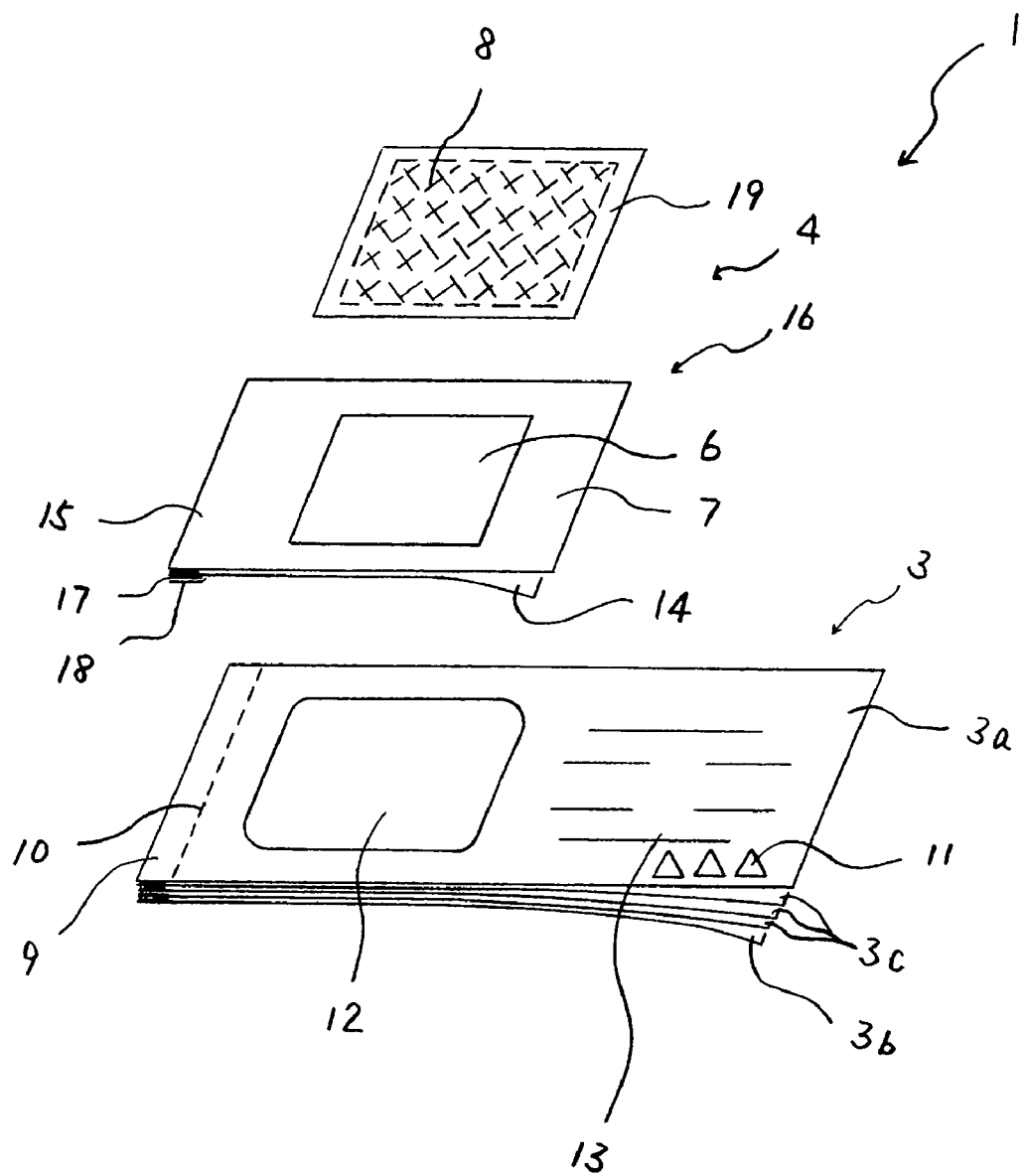
FIG. 1 is an oblique view of a shipping slip relating to the present invention.
Figure 2:
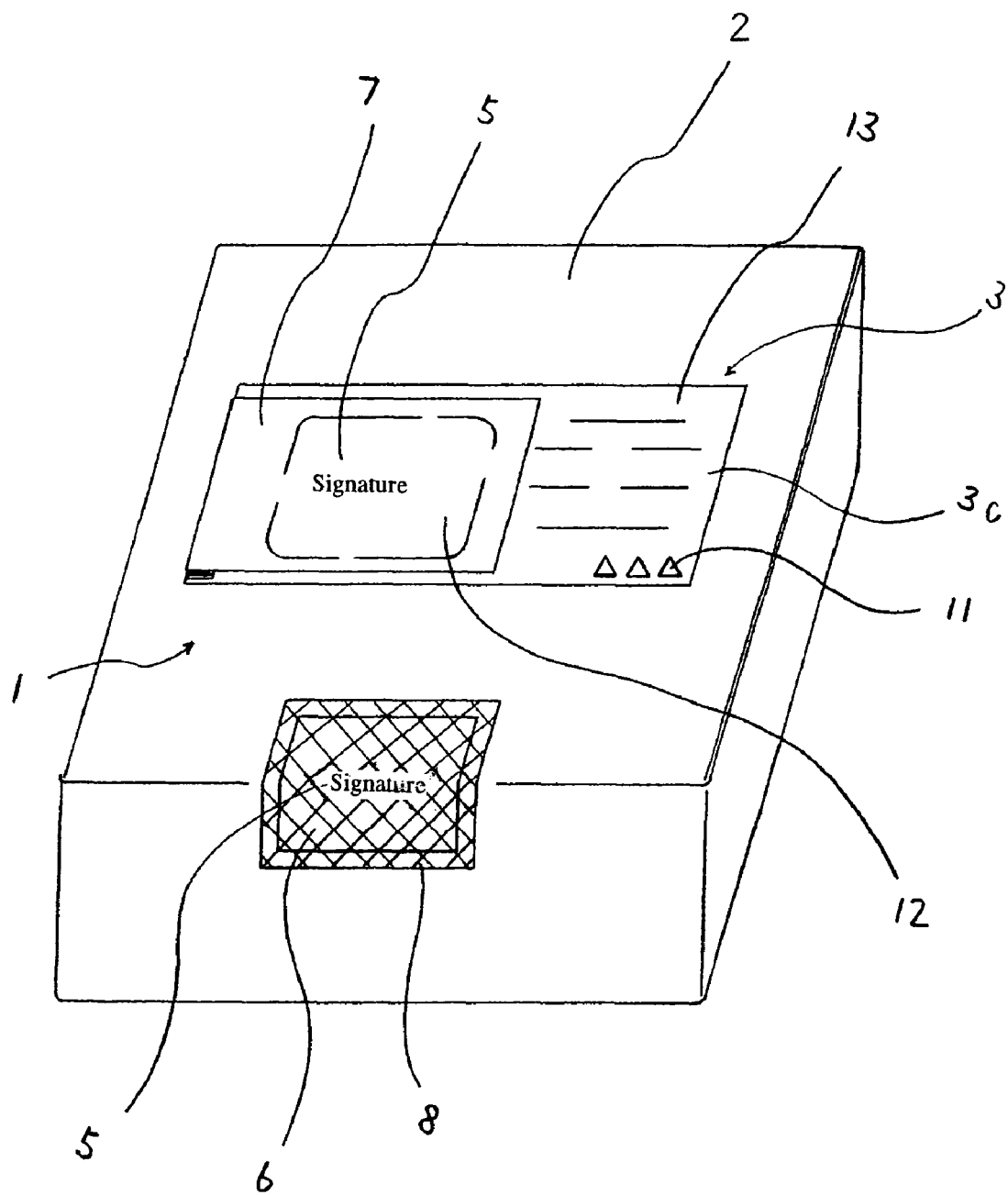
FIG. 2 is an oblique view of an article for shipping sealed with a seal.

First, a shipping slip will be explained. FIG. 1 is an oblique view of a shipping slip relating to the present invention. FIG. 2 is an oblique view of an article for shipping sealed with a seal.

The shipping slip 1 for guaranteeing that an article for shipping 2 has remained unopened comprises a slip 3 for confirming and managing shipment, and a seal set 4 for sealing the article for shipping 2. The seal set 4 comprises a seal 6 on which a sender enters a signature (sender-provided information) 5 and which seals the article for shipping 2, a sheet for verification 7 to which the signature 5 entered on the seal 6 is to be copied, and a cover seal 8 to be affixed so as to cover the seal 6.

The slip 3 is a form enabling entry of information in multiple copies, comprising a sender's copy 3a, recipient's copy 3b and shipping control slip 3c in superimposed fashion; one end of the slip 3 has a glue portion 9 at which the slip is glued together, and perforations 10 along which the paper slips 3a, 3b, 3c can be cut off. The paper slips 3a, 3b, 3c have a common code number (slip-specific information) 11 printed thereon, so individual shipping slips 1 can distinguished be from one another by the code number 11. The shipping control slip 3c comprises a plurality of paper slips, for example, for distribution data management, package management, receipt and the like.

A signature space 12 is provided on the paper slips 3a, 3b, 3c of the slip 3; when the seal 6 and sheet for verification 7 are superimposed thereon and the signature 5 is made, the signature 5 on the seal 6 is copied to the sheet for verification 7 and the paper slips 3a, 3b, 3c. Further, the paper slips 3a, 3b, 3c have a space 13 for entry of necessary items such as recipient's address; the necessary items are entered on the top sheet, i.e., the sender's copy 3a, and the entries are copied to the other paper slips 3b and 3c.

The seal 6 allows entry of the signature 5 on the top surface thereof, and is on the front face of the sheet for verification 7 serving as a release paper. The sheet for verification 7 is a sheet formed of a translucent material so as to permit viewing therethrough and having release properties; provided on the back surface thereof is a carbon paper 14 for copying the signature 5 entered on the seal 6 to the sheet for verification 7 and sender's copy 3a.

The sheet for verification 7 and carbon paper 14 constitute a copy set 16 having the seal 6, sheet for verification 7 and carbon paper 14 glued together at the glue portion 15 at one end thereof. Provided on the back surface of the glue portion 15 of the copy set 16 is an adhesive layer 17 for affixing the copy set 16 to the slip 3, the adhesive layer 17 being covered with a release paper 18.

The cover seal 8 is formed as a lustrous mesh and is held to the article for shipping 2 and seal 6 by a holding film 19 in a manner enabling copying of entries thereto. Because of its mesh shape, the cover seal 8 allows the lower layer to be viewed and the signature 5 on the seal 6 can be seen. Further, the mesh-like cover seal 8 is configured so that it cannot maintain its shape when removed, so that when it is removed from the article for shipping 8, it is reliably destroyed.

Further, because the cover seal 8 is lustrous, even if a person attempts to tamper with the seal by cutting and opening the seal 6 and cover seal 8 and then covering the cut section with another translucent seal so that it appears not to have been opened, the tampering can be detected due to the translucent seal having lost the mesh-like luster. Alternatively, the seal 6 can be made lustrous and the mesh-like cover seal 8 can be made non-lustrous.

Figure 3:
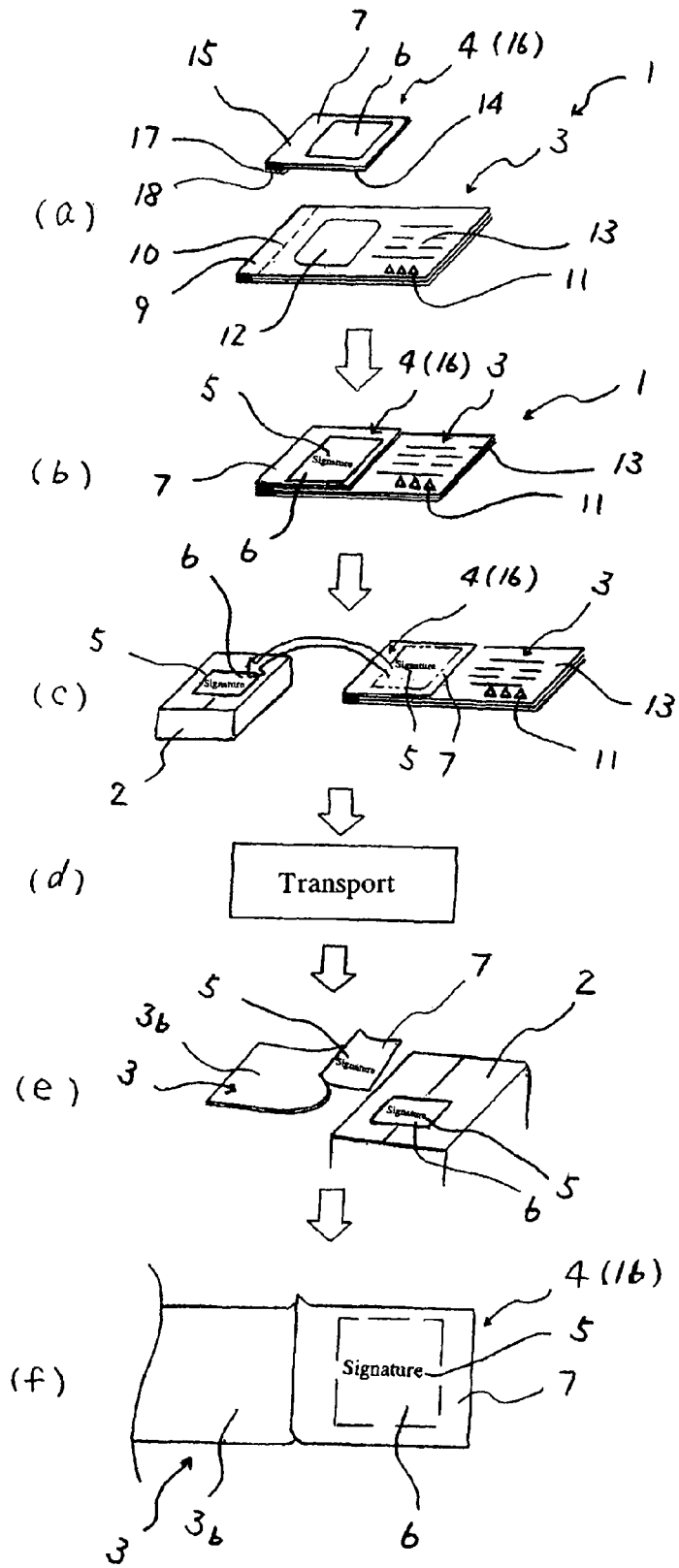
FIG. 3 is for explaining the process of a shipping method relating to the present invention.

Next, an explanation will be made for a shipping method using the above shipping slip for guaranteeing that an article for shipping has remained unopened. FIG. 3 illustrates steps of the shipping method relating to the present invention.

First, as shown in (a), when the article for shipping 2 is accepted from a sender, the release paper 18 is removed from the copy set 16, the adhesive layer 17 is aligned with the glue portion 9 of the slip 3, and the copy set 16 is affixed to the front face of the slip 3. At this time, the seal 6 of the copy set 16 overlaps with the signature space 12 of the slip 3. Alternatively, the slip 3 may be prepared with the copy set 16 incorporated therein.

As shown in (b), a sender enters the signature 5 on the seal 6 of the copy set 16. From the pressure of the writing implement, the signature 5 is copied to the sheet for verification 7 on the front side of the carbon paper 14 and the signature space 12 of the sender's copy 3a on the back side of the carbon paper 14. Further, the signature 5 is also copied to the other paper slips 3b, 3c of the slip 3. Further, because the sender makes entry of required items such as recipient's address in the space 13 of the sender's copy 3a, the entered details are copied to the other paper slips 3b, 3c of the slip 3. The sender's copy 3a is torn off from the slip 3 and given to the sender.

As shown in (c), the seal 6 is removed from the sheet for verification 7 of the copy set 16, and the article for shipping 2 is sealed with the seal 6. Further, the cover seal 8 is transferred from the holding film 19 so as to cover the seal 6. The sender can be asked to perform these operations.

As shown in (d), the shipping slip 1 and the article for shipping 2 are transported to a recipient. Meanwhile, the sender may use a telephone or the like to relay the code number 11 of the shipping slip 1 or may separately send the sender's copy 3a to the recipient.

As shown in (e), the recipient is asked to check the signature 5 entered on the seal 6 sealing the article for shipping 2, and to confirm that the seal 6 has not been broken. Verification of the signature 5 entered on the seal 6 is carried out as follows. After the signature 5 copied to the slip 3 is checked against the signature 5 copied to the sheet for verification 7 to confirm that the sheet for verification 7 has not been replaced, the signature 5 entered on the seal 6 is checked against the signature 5 copied to the sheet for verification 7. Here, the signature 5 is checked by superimposing the translucent sheet for verification 7 on the signature 5.

As shown in (f), if the signature 5 on the seal 6 or sheet for verification 7 has been forged, because these signatures 5 do not match each other, the forgery of the signature 5 can be easily detected. After the checked signatures 5 are confirmed to match, the article for shipping 2 is delivered to the recipient with the guarantee that the article for shipping 2 has remained sealed with the seal 6 having the signature 5 entered by the sender, and the article for shipping 2 has remained unopened from time of acceptance from sender to delivery to recipient.

In cases where the code number 11 of the shipping slip 1 has been relayed to the recipient, it is confirmed that the relayed code number 11 and the code number 11 on the delivered shipping slip 11 match, and that the slip 3 has not been replaced, thereby more reliably guaranteeing that the article for shipping 2 has remained unopened. Further, in cases where the sender's copy 3a has been separately sent, the signature 5 copied to the sender's copy 3a is checked against the signature 5 copied to the sheet for verification 7, confirming that the slip 3 has not been replaced, thereby even more reliably guaranteeing that the article for shipping 2 has remained unopened.

The present invention is not limited to the specific configurations explained in the embodiments, and various modifications can be added to the scope of the present invention. For example, as an alternative to delivery of the sheet for verification 7 together with the article for shipping 2, the sheet for verification 7 and article for shipping 2 may be separately delivered to the recipient to prevent forgery of the sheet for verification 7. As an alternative to covering the seal 6 with the cover seal 8, a seal that itself is broken may be used as the seal 6. As an alternative to the carbon paper 14, means for non-carbon type copying using a combination of microcapsules containing a developer and colorant may be used.

In the above embodiment the cover seal 8 is incorporated in the slip 3. Alternatively (by way of example and without imposing limitations) the cover seal 8 may be separated from the slip 3, so that a distributor holds the cover seal 8 and uses it as appropriate, depending on circumstances.

The shipping method and shipping slip relating to the present invention can be used in the shipping of, for example, documents and packages. Because users can be given the guarantee that enclosures containing documents or packages have been unopened, they can use shipping services with peace of mind, even when sending confidential documents and valuable goods.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A method for shipping an article from a sender to a recipient, and guaranteeing that the article has remained unopened in a period from acceptance from the sender until delivery to the recipient, comprising:
   obtaining on a seal sender-provided information at a time of acceptance of the article from the sender;
   copying the sender-provided information from the seal onto a verification sheet formed of a translucent material so as to permit viewing therethrough;
   sealing the article with the seal and transporting the article to the recipient;
   delivering the verification sheet to the recipient together with or separately from the article;
   at time of delivery of the article to the recipient, superimposing the verification sheet against the seal; and
   checking the sender-provided information on the seal against the sender-provided information on the verification sheet while the verification sheet is superimposed over the seal, thereby guaranteeing that the article has remained sealed with the seal.

2. A method for shipping an article from a sender to a recipient, and guaranteeing that the article has remained unopened in a period from acceptance from the sender until delivery to the recipient, comprising:
   at time of acceptance of the article from the sender, superimposing a seal and verification sheet on a slip comprising a sender's copy, recipient's copy and shipping control slip so as to enable copying;
   obtaining sender-provided information on the seal;
   copying the sender-provided information to both the verification sheet and the slip;
   sealing the article with the seal and transporting the article to the recipient;
   delivering the verification sheet to the recipient together with or separately from the article;
   at a time of delivery of the article to the recipient, checking the sender-provided information on the verification sheet against the sender-provided information on the slip, thereby confirming that the verification sheet has not been replaced; and checking the sender-provided information on the seal against the sender-provided information on the verification sheet, thereby guaranteeing that the article has remained sealed with the seal.

3. The shipping method of claim 2, further comprising checking slip-specific information provided on the slip for confirming that the slip has not been replaced.

* * * * *